United States Patent [19]

Fremerey et al.

[11] 4,395,914

[45] Aug. 2, 1983

[54] GAS FRICTION VACUUM METER AND METHOD OF MAKING MEASURING BODY

[75] Inventors: Johan K. Fremerey, Bonn; Bernd Lindenau, Julich, both of Fed. Rep. of Germany

[73] Assignee: Kernforschungsanlage Jülich GmbH, Jülich, Fed. Rep. of Germany

[21] Appl. No.: 263,563

[22] Filed: May 14, 1981

[30] Foreign Application Priority Data

May 21, 1980 [DE] Fed. Rep. of Germany ....... 3019315

[51] Int. Cl.$^3$ .................................................. G01L 7/00
[52] U.S. Cl. ..................................................... 73/700
[58] Field of Search ........... 73/30, 700, 432 G, 517 B; 308/10

[56] References Cited

U.S. PATENT DOCUMENTS 2,691,306 10/1954 Beams et al. ...................... 73/432 G
3,041,482 6/1962 Beams ................................... 308/10

OTHER PUBLICATIONS

"Scientific Foundations of Vacuum Technique", Wiley, New York, 1962, pp. 254, 256.
Fremery and Boden, "Active Permanent Magnet Suspension for Scientific Instruments", Journal of Physics E Scientific Instruments, Feb. 1978, vol. 11, pp. 97–184.
Comsa, Fremery, Lindenau, "Tangential Momentum Transfer in Spinning Rotor Molecular Gauges", Proc. 7th Intern. Vac. Congr. & 3rd Intern. Conf. Solid Surfaces, (Vienna, 1977), pp. 157–160.

Primary Examiner—Donald O. Woodiel
Attorney, Agent, or Firm—Karl F. Ross; Herbert Dubno

[57] ABSTRACT

A rotary measuring body for a gas-friction vacuum meter has its surface formed with a macroscopic roughness which provides a gas-friction coefficient minimally affected by the microscopic roughness of the surface. As a result, the output signal and sensitivity of the vacuum meter is high and is less susceptible to change as a result of surface corrosion.

7 Claims, 2 Drawing Figures

GAS FRICTION VACUUM METER AND METHOD OF MAKING MEASURING BODY

FIELD OF THE INVENTION

The present invention relates to a gas-friction vacuum meter and, more particularly, to a device for measuring the level of a high vacuum using the friction between gas molecules of an evacuated space and a rotating body (measuring body).

This invention also relates to a method of making a rotary body for a gas-friction vacuum meter.

BACKGROUND OF THE INVENTION

It is known that, when a measuring body is set into motion with a low level of mechanical-contact friction, gas molecules impinging upon the surface of this body tend to brake its rotation as a result of friction between the surface, which can be considered to have microscopic roughness, and these gas molecules.

Gas-friction vacuum meters utilizing this principle are known (see Dushman and Lafferty, "Scientific Foundations of Vacuum Technique", Wiley, New York, 1962).

A gas-friction vacuum meter is a measuring instrument for determining pressure especially in the high vacuum range. The measurement parameter for pressure determinations is the braking of a freely rotating body by the impingement of gas molecules on a surface of this body in the evacuated space or in a measuring cell or chamber connected with this space.

To exclude mechanical friction losses, i.e. the braking effect of bearing or contact friction, the rotating body is suspended in a contactless bearing system, preferably a magnetic bearing.

The rotating body can be in the form of a flat disk, a cylindrical or conical element or a ball; preferably it is a magnetically journaled ball.

It is customary for the rotating body to have polished or smooth surfaces. Smooth-surface rotary bodies are characterized by a gas-friction coefficient which is largely independent of the type of gas in the evacuated space. Apparently such smooth or polished surfaces have a microscopic roughness generated by the presence of adsorbates on the surface, which results in diffuse scattering of the impinging gas molecules thereby rendering the braking effect independent of the nature of these molecules but sensitive to the density or number of impinging molecules per unit time, a function of the pressure.

It has been found, however, that the gas friction coefficients of extremely clean adsorbate-free surfaces of rotating measuring bodies as are encountered when such bodies are placed in ultrahigh vacuum environments, have greatly reduced values (see R. G. Lord, *Tangential Momentum Accommodation Coefficients of Rare Gases on Polycrystalline Metal Surfaces*, Rarefied Gas Dynamics, AIAA, New York, 1977, pages 531 ff.).

Such a reduction in the gas-friction coefficient is a phenomenon associated with a frictionless "reflection" of the gas molecules upon their impingement upon a macroscopically smooth surface of a rotating body which is deficient in microscopic roughness. The gas-surface momentum exchange under these conditions is thus of the "mirror" type and the surface can be referred to as a mirror surface.

Additionally the gas-friction coefficient of the rotating body is affected by macroscopic surface variations. For example, in the case of corrosion or the development of soot deposits upon the surface, the gas-friction coefficient is raised to high levels although the measurement precision decreases sharply since deviations in the gas-friction coefficient can greatly exceed the measurement precision of about 1% with instruments normally used.

OBJECTS OF THE INVENTION

It is the principal object of the present invention to provide an improved gas-friction vacuum meter, capable of use in ultrahigh vacuum applications, with high sensitivity, measurement precision and reproducibility.

Another object of the invention is to provide a gas-friction vacuum meter whereby the disadvantages of earlier devices of this type are obviated.

Yet a further object of this invention is to provide an improved rotating measuring body for a gas-friction vacuum meter whose gas-friction coefficient is substantially independent of corrosion-induced and deposition-induced changes in the microscopic roughness and macroscopic surface variation.

It is also an object of the invention to provide an improved method of making such a rotating body.

SUMMARY OF THE INVENTION

These objects and others which will become apparent hereinafter are attained in accordance with the present invention in a gas-friction vacuum meter having a measuring head whose chamber communicates with a high-vacuum space and in which a measuring body is induced to rotate with a minimum of bearing friction, such that gas molecules from the space impinge upon and brake the rotation of this body, the braking effect being detected and serving as a measurement of the pressure in this space.

According to the invention, a macroscopic roughness is imparted to the surface of this body which generates a gas-friction coefficient minimally affected by the microscopic roughness of the surface.

Thus even though the microscopic roughness of the surface may vary dramatically in terms of the coefficient of friction attributable to the microscopic roughness alone, all such variations are drowned out by the contribution to the gas-friction coefficient of the uniform macroscopic roughness imparted to this surface.

The macroscopic roughness of the surface is so selected that even with a low degree of microscopic roughness, a diffuse scattering of the gas molecules will occur. In this case, the resultant gas-friction coefficient will be largely independent of the microscopic roughness, the braking effect will be substantially independent of the type of gas in the space, and surface corrosion or deposition will have significantly less effect on the measurement precision than is the case when a polished surface is used.

The present invention thus breaks sharply with the traditional approach in this field which has been to polish the impinging surface of the measuring body so as to eliminate macroscopic roughness and to develop a uniform microscopic roughness. The invention is based upon the discovery that uniform macroscopic roughness gives a substantially higher gas-friction coefficient and hence response than has hitherto been the case, with independence from variation due to different types of gases and with sharply lower fluctuations in the measurement precision due to corrosion and like effects.

Preferably, the macroscopic roughness of the surface is at least sufficient to provide a relative gas-friction coefficient, i.e. a gas-friction coefficient in a ratio to that of a smooth surface with maximum microscopic roughness, which has a value of 1.1.

It has also been found to be desirable to limit the macroscopic roughness of this surface so that at a maximum it will yield a relative gas-friction coefficient (ratio of gas-friction coefficient of the macroscopically roughened surface to the gas-friction coefficient of a smooth surface with maximum microscopic roughness) that has a value of 1.2.

Within this range, best results with respect to response, reproducibility and precision are obtained and deviation in the output resulting from adverse effects are minimum.

According to another aspect of the invention, the surface roughness of the measuring body is controlled by a direct comparison of the fabricated body with a standard body, i.e. a body whose friction coefficient has not been increased by macroscopic roughening.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
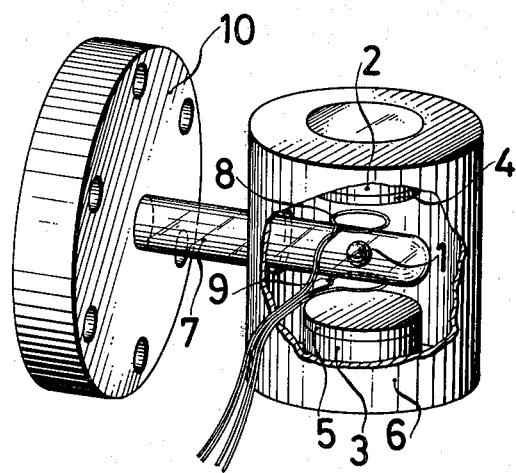
FIG. 1 is a perspective view partly broken away, of a gas-friction vacuum meter in accordance with the invention utilizing a magnetically suspended ball as the rotatable measuring member.

In FIG. 1 there is shown a gas-friction vacuum meter in highly diagrammatic form and utilizing, as the rotating measuring member, a ball 1 which is floating journaled between two permanent magnets 2 and 3 magnetized in the same direction.

In this construction, pole plates 4 and 5 are applied to the permanent magnets and preferably are composed of iron. The magnetic flux return path is formed by the housing 6 which encloses the measuring head.

The ball 1 is disposed in a chamber 7 which opens toward an evacuated space. The wall of the chamber 7 is composed of a nonmagnetic material, for example a nonmagnetic stainless steel or glass.

Between the chamber 7 and the pole plates 4 and 5 two control coils 8 and 9 are disposed. These coils can be connected to a controller (not shown in the drawing) which responds to any deviation of the ball from an equilibrium position and produces a control current to energize the coils and produce by feedback a magnetic force tending to restore equilibrium. A magnetic bearing of this type is disclosed in German patent document No. 24 440 99.

The chamber 7 is connected hermetically by a flange 10 to a vessel under high vacuum.

Figure 2:
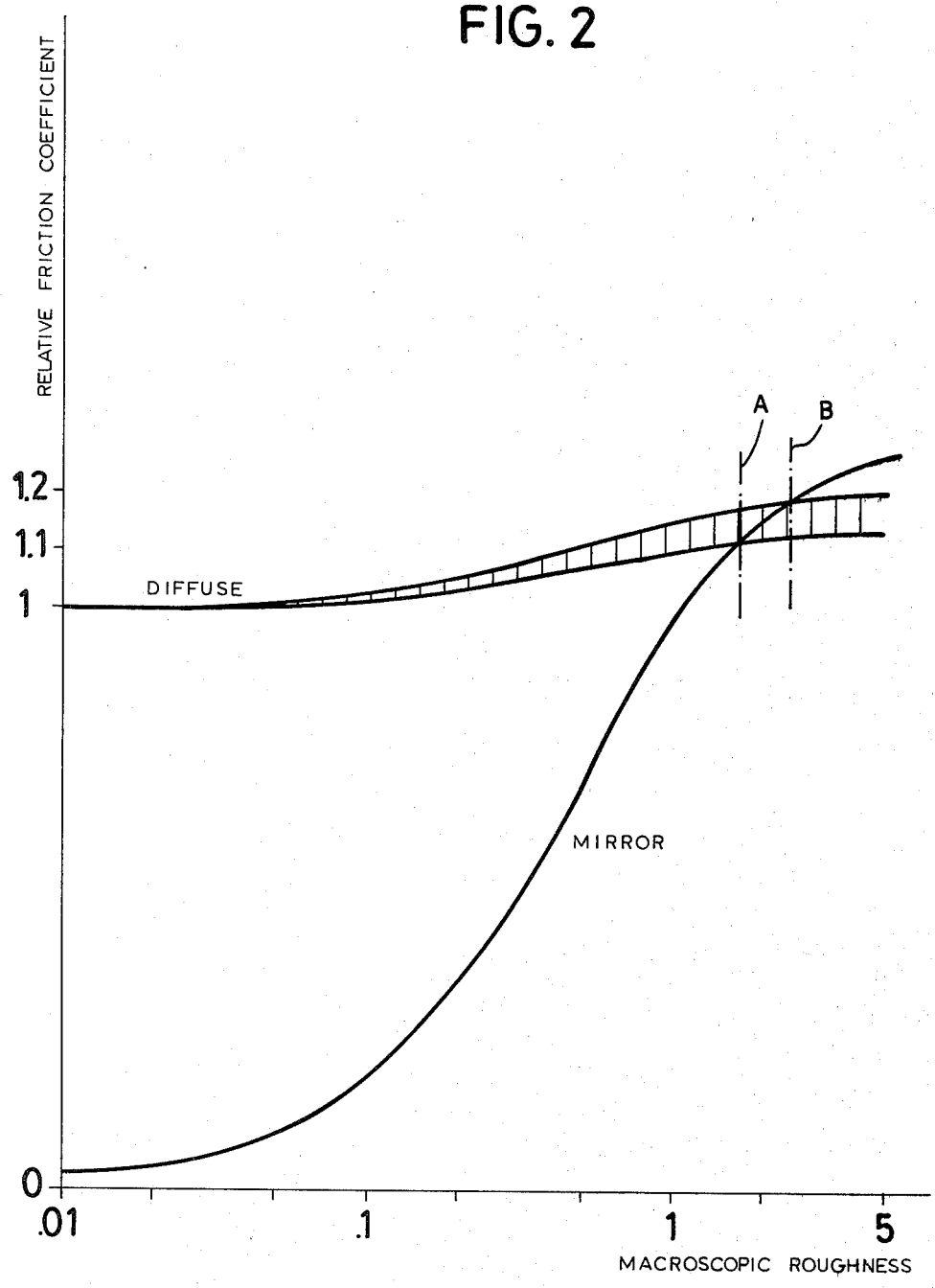
FIG. 2 is a graph showing the dependency of the relative gas-friction coefficient on macroscopic roughness for diffuse scattering in accordance with the invention and for a mirror surface.

FIG. 2 shows the theoretical relationship between the relative gas-friction coefficient in dependence upon the macroscopic roughness of the surface of the rotating body.

The relative gas-friction coefficients have been plotted along the ordinate while the maroscopic roughness is plotted along the abscissa. The relative gas-friction coefficient is the ratio between the gas-friction coefficient of the macroscopically roughened surface and the gas-friction coefficient for a smooth surface with microscopically roughened surface (corresponding to 1 along the ordinate). The macroscopic roughness plotted along the abscissa is given in logarithmic scale.

A macroscopic roughness of 1 (unity) is defined as the roughness of a surface which corresponds to the scattering produced by a multiplicity of planar surface elements inclined at 45 degrees.

The macroscopic roughness of a measuring body 1 in accordance with the present invention corresponds to the shaded region of the curve. It can be seen that, as the macroscopic roughness increases, diffuse scattering is produced within the curves bounding the limits of relative gas-friction coefficient of 1.1 and 1.2. The gas-friction coefficient does not materially change with increasing macroscopic roughness whereas the coefficient of friction for the mirror surface varies sharply for the mirror surface with macroscopic roughness. The greatest precision lies in the region at which these curves intersect, i.e. in the shaded region between the boundary lines A and B.

Rotary measuring bodies in accordance with the present invention can be fabricated by permitting one or more commercial magnetizable ball bearing balls to pass into a chamber lined with sandpaper and in which the balls are tumbled. After some time, the surfaces of the balls, previously shiny, have a matte appearance. The roughening process is then interrupted and the degree of roughness of the balls is determined.

The roughness of the balls is determined preferably by a comparison of the gas-friction coefficient of each ball, after roughening, with that of a smooth surface ball which has not been subjected to roughening.

For this purpose two gas-friction vacuum meters as shown in FIG. 1, each with one of the balls, are connected to a common vessel.

Before comparable measurements are taken, the surface of the roughened ball is cleaned from adsorbates by heating the ball in hydrogen. The vessel is then filled with an inert gas, preferably argon, to a pressure to about $10^{-4}$ mbar. The balls are then rotated by conventional means not shown in the drawing. A preferred speed corresponds to a rotation of a surface point on the body corresponding to a frequency of 400 Hz. After the balls have been brought up to this speed, the drive is deenergized and the braking of the freely rotating balls is measured and the resulting roughness determined from the diagram given in FIG. 2.

If the desired roughness has not been achieved, the ball can be returned to the drum for further tumbling. For a given size and type of balls, the duration and intensity of the tumbling to yield the designed macroscopic roughness can be ascertained by such tests. Experience has shown that thereafter the tumbling of the balls for the corresponding duration and at the corresponding intensity will reproducibly yield the macroscopic roughness in the desired range.

The measurement of the braking effect is also achieved by means not shown in the drawing and known in the vacuum meter art.

We claim:

1. In a gas-friction vacuum meter wherein a rotating body is suspended with low bearing friction in a measuring member communicating with an evacuated vessel and braking of rotary movement of said body by impingement by gas molecules against a surface of said body is measured, the improvement wherein said body has a uniform macroscopic roughness of said surface sufficient to impart a gas-friction coefficient to said surface which is substantially unaffected by microscopic roughness of said surface.

2. The improvement defined in claim 1 wherein the macroscopic roughness of said surface is at least sufficient to yield a gas-friction coefficient whose ratio to the gas-friction coefficient of a smooth corresponding surface with maximum microscopic roughness has a value of 1.1.

3. The improvement defined in claim 1 or claim 2 wherein a macroscopic roughness of said surface has a maximum such that its gas-friction coefficient is in a ratio to the gas-friction coefficient of a corresponding smooth surface with maximum microscopic roughness of 1.2.

4. In a method of making a rotary measuring body for a gas-friction vacuum meter, the improvement which comprises the steps of:
   (a) macroscopically roughening a surface of said body;
   (b) putting said body with said macroscopically roughened surface and a body with no gas-friction coefficient in respective vacuum meters communicating with a common vessel at low pressure; and
   (c) determining the relative braking of rotations of said bodies to establish the relative gas-friction coefficient of the body with the macroscopically roughened surface.

5. The improvement defined in claim 4 wherein the macroscopic roughened body is roughened by tumbling in a receptacle lined with abrasive material.

6. The improvement defined in claim 4, further comprising the step of repeating the macroscopic roughening of the macroscopically roughened body until the macroscopic roughness of said body reaches the point between the boundaries A and B of the shaded portion of the curve of the graph of FIG. 2.

7. The improvement defined in claim 4, claim 5 or claim 6 wherein the macroscopically roughened body is roughened until the relative gas-friction coefficient thereof has a value between substantially 1.1 and 1.2 relative to the gas-friction coefficient of a smooth surface of a corresponding body having maximum microscopic roughness.

* * * * *